(12) United States Patent
Auer et al.

(10) Patent No.: US 7,537,749 B2
(45) Date of Patent: May 26, 2009

(54) METHOD FOR PROCESSING IRON-LADEN SPENT SULFURIC ACID

(75) Inventors: Gerhard Auer, Krefeld (DE);
Berndt-Ullrich Köhler, Krefeld (DE);
Benno Laubach, Krefeld (DE)

(73) Assignee: Tronox Pigments GmbH, Krefeld (DE)

( * ) Notice: Subject to any disclaimer, the term of this patent is extended or adjusted under 35 U.S.C. 154(b) by 264 days.

(21) Appl. No.: 10/574,454

(22) PCT Filed: Oct. 1, 2004

(86) PCT No.: PCT/EP2004/010992

§ 371 (c)(1),
(2), (4) Date: Apr. 4, 2006

(87) PCT Pub. No.: WO2005/040040

PCT Pub. Date: May 6, 2005

(65) Prior Publication Data

US 2007/0122336 A1  May 31, 2007

(30) Foreign Application Priority Data

Oct. 6, 2003  (EP) .................................. 03022600

(51) Int. Cl.
*C01B 7/01* (2006.01)
*C01B 17/90* (2006.01)

(52) U.S. Cl. ...................... 423/531; 423/481; 423/482; 423/558; 423/DIG. 1; 423/DIG. 2

(58) Field of Classification Search .................. 423/481, 423/482, 531, 558, DIG. 1, DIG. 2
See application file for complete search history.

(56) References Cited

U.S. PATENT DOCUMENTS

| 3,635,664 | A | * | 1/1972 | Morimoto | 423/146 |
| 3,787,306 | A | | 1/1974 | Senior et al. | 204/105 R |
| 4,082,832 | A | * | 4/1978 | Watanabe et al. | 423/70 |
| 4,222,997 | A | | 9/1980 | Beecher | 423/481 |
| 4,382,916 | A | | 5/1983 | Beecher | 423/481 |
| 4,952,378 | A | | 8/1990 | Watanabe et al. | 423/139 |
| 5,417,955 | A | | 5/1995 | Connolly | 423/488 |
| 5,489,423 | A | * | 2/1996 | Mikami et al. | 423/531 |
| 7,097,816 | B2 | * | 8/2006 | Kehrmann | 423/146 |
| 7,351,391 | B1 | * | 4/2008 | Olsen et al. | 423/488 |
| 2003/0026746 | A1 | * | 2/2003 | Olsen et al. | 422/187 |

FOREIGN PATENT DOCUMENTS

| DE | 1202206 | 9/1965 |
| DE | EP0302337 | 2/1989 |
| DE | 4122920 | 1/1993 |
| FR | 1 302 041 A | 8/1962 |
| GB | 517998 | 2/1940 |
| GB | 750 496 A | 6/1956 |
| JP | 10273326 | 10/1998 |

OTHER PUBLICATIONS

PCT/EP2004/010992 International Search Report—Jan. 13, 2005 (English).
European Patent Office—Search Report for EP 03 022 600.5; Feb. 20, 2004; (4 pages).
EPO—Patent Abstracts of Japan; Publication No. 11322343; Publication date: Nov. 24, 1999; Applicant: Toshin Kagaku Kogyo KK (1 page).
EPO—Patent Abstracts of Japan; Publication No. 05017160; Publication date: Jan. 26, 1993; Applicant: Asaka Riken Kogyo KK (1 page).
Bullough, W., Cannining, T.A. and Strawbridge, M.L. "The Solubility of Ferrous Sulphate In Aqueous Solutions of Sulphuric Acid," *Journal of Applied Chemistry*, Dec. 2, 1952, pp. 703-707.

* cited by examiner

*Primary Examiner*—Timothy C Vanoy
(74) *Attorney, Agent, or Firm*—Timothy J. Monahan; Monahan & Moses, LLC

(57) ABSTRACT

The invention concerns a method for processing heavy metal-laden spent sulfuric acid. For this, iron-laden spent sulfuric acid or iron-laden sulfuric materials obtained therefrom are reacted with a material that contains iron chloride and optionally other metal chlorides, producing iron (II) sulfate. The spent sulfuric acid preferably derives from titanium dioxide production.

21 Claims, No Drawings

METHOD FOR PROCESSING IRON-LADEN SPENT SULFURIC ACID

The invention concerns a method for processing spent sulfuric acid that contains heavy metals.

Heavy metal-laden spent sulfuric acids are formed during the production of titanium dioxide using the sulfate process. Thus, the dilute acid remaining after filtering out the titanium oxide hydrate contains heavy metals like iron, which make utilization or disposal difficult.

For this reason, there has been no lack of attempts to process the dilute acid or to dispose of it, in an ecologically safe way. For instance, EP 132820 describes the possibility of evaporating the dilute acid, optionally extracting metal sulfates and reacting the remaining metal sulfates with CaO, $Ca(OH)_2$ and/or $CaCO_3$ to form gypsum and sparingly soluble metal compounds. However, this method is not very economical, in particular because of the energy needed to concentrate the dilute acid. Correspondingly, the processing of other spent sulfuric acids that contain heavy metals is generally also costly and uneconomical.

Against this background, the problem underlying the invention is to provide a method, which is improved from the environmental and cost standpoints, for disposal or utilization of iron-laden spent sulfuric acid.

This problem is solved in accordance with the invention by a method in which the iron-laden spent sulfuric acid or iron-containing processing products obtained therefrom are reacted with a material that contains iron chlorides and optionally other metal chlorides, whereby iron (II) sulfate is obtained. HCl is preferably obtained in addition in this way, and this can be separated and reused in gaseous form and/or as aqueous hydrochloric acid.

The concentration of the spent sulfuric acid is not particularly restricted and generally amounts to 10 to 90%. Therefore, dilute acid with an $H_2SO_4$ concentration of 20 to 30% can be used directly. Or use can be made of washing acids or process acids that contain dilute acid and that have a low concentration of $H_2SO_4$. Prior to the reaction, however, the acid can be concentrated, e.g., to a concentration of 50-70%, or even 70-90%. In addition to iron ions, the spent sulfuric acid can contain other metal ions such as manganese or titanium. The content of iron ions preferably amounts to 2 to 22 wt %.

It is also possible to utilize products that are obtained from spent sulfuric acid, e.g.:
spent sulfuric acid, which has been concentrated, containing suspended crystalline iron sulfate;
solids that contain iron sulfate (e.g. a filter cake in the form in which it is generated during the separation of metal sulfates, which contain iron sulfate, from solutions that contain sulfuric acid) together with sulfuric acid adhering thereto (filter salts).

These products, which are obtained from spent sulfuric acid, can also be used in any desired combination with spent sulfuric acid that contains iron sulfate.

The spent sulfuric acid used in accordance with the invention or the material obtained that is obtained therefrom preferably derives from titanium dioxide production using the sulfate process, from the smelting of copper, lead or zinc, or it is generated as a byproduct of an organic synthesis process, or is a pickling solution resulting from the pickling of steel with sulfuric acid.

The material which is reacted with the sulfuric acid also contain other additional metal chlorides, such as those of chromium, vanadium, niobium, and zirconium, along with iron chloride. The material can be present in the form of a solid, a suspension, or a solution in hydrochloric acid, and preferably as a solution in hydrochloric acid. The material preferably contains iron chloride in a quantity of 10-30 wt %. However, the iron chloride can also be present in a quantity of 30-60 wt % in the case where solids, slurries, or suspensions are present. The respective materials are formed, for example, in the processing of pickling solutions or as residues in the manufacture of titanium dioxide by the chloride process. Generally, the material does not derive from the same process as the spent sulfuric acid.

Hydrochloric acid pickling solutions, which are generated, for instance, during the pickling of steel, generally contain 14 to 25% iron(II) chloride, 3 to 7% HCl and various contaminants that derive from the pickled steel. Various processes are known in which these pickling solutions or their processing products are reacted with sulfuric acid to obtain iron sulfate and to recycle the pickling solution. For instance, U.S. Pat. No. 4,222,997 describes a process in which the pickling solution is concentrated at first and then reacted with concentrated (95 to 98%) sulfuric acid. According to U.S. Pat. No. 4,382,916, the pickling solution is concentrated until iron(II) chloride precipitates, which is then reacted with sulfuric acid to form iron(II) sulfate monohydrate. DE 41 22 920 Al and WO 01/49901 A1 describe methods in which a pickling solution is reacted with sulfuric acid to form iron(II) sulfate heptahydrate. The reaction conditions described in these documents for the reaction of sulfuric acid with the pickling solution can also be employed in accordance with the present invention when using spent sulfuric acid from the titanium dioxide production. However, since these methods are generally carried out with pure concentrated sulfuric acid that has a concentration of more than 90%, while in accordance with the present invention the spent sulfuric acid has a concentration that is generally less than 90% and frequently only 20 to 30% and it also contains iron and other metal ions, the concentration of the iron chloride-containing material is appropriately adjusted. When dilute acid is used, the reaction with a solid iron chloride-containing material or iron chloride-containing suspensions or highly concentrated iron chloride-containing solutions is preferred, while concentrated dilute acids or filter salts are preferably reacted with less concentrated $FeCl_2$ solutions.

Initially, iron (II) chloride and other metal chlorides can be separated as solids from the pickling solution. The solid matter is then dissolved in the spent sulfuric acid at elevated room temperature, and then iron (II) sulfate is precipitated by reducing the temperature. Alternatively, the pickling solution can be reacted directly with the spent sulfuric acid. Then, iron (II) sulfate is precipitated by reducing the temperature. As a result of a suitable selection of the parameters, a situation can be achieved in which the iron sulfate crystallizes out essentially in the form of iron sulfate heptahydrate. However, the reaction conditions can also be configured in such a way that predominately iron sulfate monohydrate crystallizes out. The selection of the parameters naturally depends on the requirements of the iron sulfate in regard to its further usage. High temperatures during the reaction and high concentrations of sulfuric acid favor the crystallization of iron sulfate monohydrate, while low temperatures during the reaction and low concentrations of sulfuric acid favor the crystallization of iron sulfate heptahydrate.

The process of crystallizing the iron sulfate heptahydrate is generally preferred since, as a result of the high quantity of water of crystallization, concentrating the solution is required only to a minor extent, or such concentrating can even be omitted completely.

With the appropriate control of the temperature in the reactor to a maximum of 50° C., preferably 30 to 45° C., the iron(II) sulfate precipitates in the form of the heptahydrate, which is particularly preferred. Parameters can be selected such that the other metal sulfates, which can originate both from the spent sulfuric acid and from the pickling solution, do not achieve their solubility product under the reaction conditions and remain in solution (in this way, the iron(II) sulfate is obtained in high purity); or the parameters can be selected such that the other metal sulfates essentially crystallize out together with the iron sulfate. The selection of parameters naturally depends on the purity requirements for the iron sulfate with regard to its further use.

If a supernatant that contains other metals is obtained, it can be disposed of in a known way. For example, the metals can be precipitated in the form of their hydroxides and then dried. The pH value is preferably increased in steps in this connection, whereby this is done in order to permit selective precipitation.

This preparation of iron(II) sulfate from spent sulfuric acid and a pickling solution is particularly economical compared to the production of iron(II) sulfate from pure sulfuric acid, since (i) the spent sulfuric acid is economically more favorable, (ii) its use does not give rise to any additional costs in spite of the presence of heavy metals, since further processing is necessary even when using pure sulfuric acid because of the contaminants in the pickling solution, and (iii) its use increases the production of iron(II) sulfate because of its iron content, and the process of crystallization of iron sulfate is promoted by the increased concentration. Thus, in the treatment of pickling solutions, the spent sulfuric acid can replace the pure sulfuric acid essentially without a loss of quality and it moreover has additional advantages if a utilization of the iron sulfate is desired. Thereby, not only an economical, but also an ecologically compatible utilization of the iron-containing spent sulfuric acid, as is obtained, for example, from titanium oxide production using the sulfate process, or of a sulfuric acid pickling solution are ensured. Moreover, it is possible to reduce the acidity of the iron chloride-containing material and/or the iron sulfate-containing material before or after the reaction with the other material through the addition of metallic iron or iron oxides or a mixture of both and at the same time to increase the concentration of iron.

A large number of degrees of freedom exist in the selection of a suitable concentration for the reaction of the iron chloride-containing material with the iron sulfate-containing material which is to be as efficient as possible, and the crystallization and separation of the iron sulfate that are to be as efficient as possible; thus he using iron-containing sulfuric acid of low Concentration (e.g., dilute acid from the production of titanium dioxide), reaction with the solid metal chlorides in a highly concentrated suspension of metal chlorides in aqueous solution can be particularly advantageous. When using highly concentrated sulfuric acid (e.g., from gas purification procedures, or concentrated dilute acid from the production of titanium dioxide, or of metal sulfates in the form in which these are generated during the concentration of dilute acid from the production of titanium dioxide that can contain sulfuric acid that is still adhering thereto or of crystalline iron-containing metal sulfates that are suspended in sulfuric acid), conversely, reaction with a solution of metal chlorides of low concentration can be particularly advantageous. These degrees of freedom—in addition to temperature and pressure—can also be utilized in order to crystallize iron sulfate monohydrate or iron sulfate heptahydrate in a controlled manner.

Another material that can be used for the reaction with the spent sulfuric acid are the metal chloride residues that are generated in the titanium dioxide production using the chloride process. Processing of these residues is particularly costly because of their heavy metal content and is described inter alia in EP 390 293 A1 and DE 42 43 559 A1. After separating them from the stream of titanium tetrachloride—generally by means of a cyclone that is serially connected downstream of the fluidized-bed reactor—a mixture of solids is obtained which is also designated cyclone dust and which comprises unconsumed titanium dioxide, silicon dioxide, coke, iron(II) chloride, as well as other chlorides. By dissolving the cyclone dust in dilute hydrochloric acid and separating the water-insoluble components or by leaching with hydrochloric acid a solution is obtained that predominantly contains iron(II) chloride, but also aluminum chloride, manganese chloride, magnesium chloride, zirconium chloride and trace elements of chromium, niobium and vanadium in the form of their chlorides. The iron ion content preferably amounts to 10 to 30 wt %.

Optionally after separating the insoluble components, this iron(II) chloride-containing material is then reacted with the spent sulfuric acid, for example, a spent sulfuric acid from the titanium dioxide production using the sulfate process, whereby the temperature control is selected such that iron(II) sulfate precipitates. With an appropriate control of the temperature in the reactor to a maximum of 50° C., preferably 30 to 45° C., the iron(II) sulfate precipitates in the form of the heptahydrate, which is particularly preferred. Since the other metal sulfates, which originate from both the spent sulfuric acid and the metal chloride waste solution, generally do not reach their solubility product under the reaction conditions, they remain in solution. Thus, the iron(II) sulfate is obtained in good purity.

If a supernatant is obtained, which contains the other metals, this can be disposed of in a known manner. For example, the metals can be precipitated in the form of their hydroxides, and then dried. The pH value is preferably increased in steps in this connection, whereby this is done in order to permit selective precipitation. Reaction with Ca compounds is particularly preferable, whereby only those fractions remain behind that have a low solubility in water, and this is in contrast to the neutralization of the metal chlorides with Ca compounds.

This manufacture of iron(II) sulfate from spent sulfuric acid and a metal chloride waste solution from the production of titanium dioxide, using the chloride process, represents a particularly economical utilization of these waste products, especially in titanium dioxide plants in which titanium dioxide is manufactured using both the sulfate process and the chloride process, or in pickling plants in which pickling is conducted using both sulfuric acid and hydrochloric acid, and thus the two waste products each are generated in the same plant. The extraordinary significance of the solution in accordance with the present invention results in particular from the fact that up to now, many industrially costly and expensive or ecologically questionable disposal processes have been practiced on an industrial scale for both waste products, namely the iron-containing spent sulfuric acid and the iron-containing metal chloride residues, which become obsolete when using the method according to the present invention.

EXAMPLE 1

100 mL (=133.4 g) of an $FeCl_2$ solution with the following composition

| | |
|---|---|
| FeCl$_2$ = | 250 g/l |
| Mn = | 26 g/l |
| Nb = | 8.1 g/l |
| Al = | 7.7 g/l |
| Mg = | 5.9 g/l |
| V = | 4.3 g/l |
| Ti = | 2.3 g/l |
| Cr = | 2.1 g/l |
| HCl = | 24 g/l | were mixed with 112.8 g of a sulfate sludge (containing about 120% of the stoichiometrically required amount of sulfuric acid) in the form generated during the concentrating of dilute acid from titanium dioxide production using the sulfate process. The sulfate sludge comprises crystalline metal sulfates suspended in sulfuric acid; its iron content is typically about 4 to 10 wt % (as Fe).

After subsequent separation of the resulting hydrochloric acid by distillation at 103 to 107° C., about 118.6 g of a residue were obtained which were comprised of predominantly iron sulfate and approximately 0.1 wt % chloride.

EXAMPLE 2

100 mL (=133.4 g) of an FeCl$_2$ solution with the following composition

| | |
|---|---|
| FeCl$_2$ = | 250 g/l |
| Mn = | 26 g/l |
| Nb = | 8.1 g/l |
| Al = | 7.7 g/l |
| Mg = | 5.9 g/l |
| V = | 4.3 g/l |
| Ti = | 2.3 g/l |
| Cr = | 2.1 g/l |
| HCl = | 24 g/l | were mixed with 96 g of a sulfate sludge (containing about the stoichiometrically necessary amount of sulfuric acid) in the form generated during the concentrating of dilute acid from titanium dioxide production using the sulfate process. The sulfate sludge comprises crystalline metal sulfate suspended in sulfuric acid; its iron content is typically about 4 to 10 wt % (as Fe).

After subsequent separation of the resulting hydrochloric acid by distillation at 103 to 107° C. about 104.7 g of a residue were obtained which were comprised of predominantly iron sulfate and approximately 0.3 wt % chloride.

EXAMPLE 3

88.4 g of a mixture of metal chlorides with insoluble residues from the titanium dioxide production using the chloride process with the composition

| | |
|---|---|
| FeCl$_2$ * 4H$_2$O = | 43.6 g |
| FeCl$_3$ = | 3.9 g |
| MnCl$_2$ * 4H$_2$O = | 8.3 g |
| AlCl$_3$ * 6H$_2$O = | 9.2 g |
| MgCl$_2$ * 6H$_2$O = | 5.1 g |
| TiCl$_4$ = | 4.7 g |
| titanium slag = | 7.2 g |
| petroleum coke = | 6.3 g | were mixed with 102.9 g of a sulfate sludge (containing about 120% of the stoichiometrically required amount of sulfuric acid), in the form generated during the concentrating of dilute acid from titanium dioxide production using the sulfate process. The sulfate sludge comprises crystalline metal sulfates suspended in sulfuric acid; its iron content is typically about 4 to 10 wt % (as Fe).

After subsequent separation of the resulting hydrochloric acid by distillation at 103 to 107° C. (80 min at an oil bath temperature of 180° C.) about 127.1 g of a residue were obtained which were comprised of predominantly iron sulfate and approximately 0.4 wt % chloride.

The invention claimed is:

1. A method of processing iron-laden spent sulfuric acid or iron-laden sulfuric acid materials obtained therefrom, comprising the steps of reacting the spent sulfuric acid or sulfuric acid material with a material that contains iron chloride, and optionally other metal chlorides, whereby iron(II) sulfate is obtained, characterized in that the concentration of iron ions in the iron-laden spent sulfuric acid or in the iron-laden sulfuric acid material obtained therefrom is in the range of 2 to 22 weight %.

2. The method according to claim 1, characterized in that hydrochloric acid is generated in the reaction of the iron-laden spent sulfuric acid or iron-laden spent sulfuric acid material, and the metal chlorides, and the hydrochloric acid is separated from the reaction mixture in gaseous form or in the form of aqueous hydrochloric acid, and then utilized.

3. The method according to claim 1, characterized in that the spent sulfuric acid derives from titanium dioxide production using the sulfate process.

4. The method according to claim 1, characterized in that the spent sulfuric acid derives from the smelting of copper, lead or zinc.

5. The method according to claim 1, characterized in that the spent sulfuric acid is a byproduct of an organic synthesis.

6. The method according to claim 1, characterized in that the spent sulfuric acid is pickling solution.

7. The method according to claim 1, wherein the spent sulfuric acid has an H$_2$SO$_4$ content of from 10 to 90 weight %.

8. The method according to claim 1, wherein the spent sulfuric acid has an H$_2$SO$_4$ content of 20 to 30 weight %.

9. The method according to claim 1, characterized in that the iron chloride-containing material is in the form of a hydrochloric acid solution.

10. The method according to claim 1, characterized in that the iron chloride-containing material contains 10 to 30 weight % iron ions.

11. The method according to claim 1, characterized in that the iron chloride-containing material is selected from the group consisting of a pickling solution and products resulting from the processing of a pickling solution.

12. The method according to claim 1, characterized in that the iron chloride-containing material is obtained by concentrating a pickling solution.

13. The method according to claim 1, characterized in that the iron chloride-containing material derives from the production of titanium dioxide using the chloride process.

14. The method according to claim 13, characterized in that the iron chloride-containing material contains the iron-containing metal chlorides that are separated after the chlorination.

15. The method according to claim 1, characterized in that the iron chloride-containing material comprises the Cl-containing residues that are generated during the production of synthetic rutile from titanium- and iron-containing raw materials.

16. The method according to 1, characterized in that either the iron chloride-containing material or the iron sulfate containing material is reduced in acidity prior to being reacted, or the product of the reaction is reduced in acidity, by adding metallic iron or iron oxides, or both, thereby increasing the iron concentration.

17. The method according to claim 1, characterized in that the metal sulfates, other than iron sulfate, that remain in the solution after crystallization of the iron sulfate are carried off for separate utilization or disposal.

18. The method according to claim 17, characterized in that the metal sulfates, other than iron sulfate, are neutralized with Ca compounds.

19. The method according to claim 1, characterized in that the iron sulfate-containing spent sulfuric acid or the iron-laden sulphuric acid materials obtained therefrom are transported from the place at which they were generated, through a pipe, to the place of the reaction with the iron chloride-containing material takes place.

20. The method according to claim 1, characterized in that the concentration of iron ions in the spent sulfuric acid is 2 to 5 weight %.

21. A method of claim 20, characterized in that the spent sulfuric acid derives from titanium dioxide production using the sulfate process.

* * * * *